US009519581B2

(12) United States Patent
Banta et al.

(10) Patent No.: US 9,519,581 B2
(45) Date of Patent: Dec. 13, 2016

(54) STORAGE INTEGRATION FOR HOST-BASED WRITE-BACK CACHING

(71) Applicant: VMware, Inc., Palo Alto, CA (US)

(72) Inventors: Andrew Banta, Reno, NV (US); Erik Cota-Robles, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 162 days.

(21) Appl. No.: 14/028,101

(22) Filed: Sep. 16, 2013

(65) Prior Publication Data

US 2015/0081979 A1 Mar. 19, 2015

(51) Int. Cl.
*G06F 12/08* (2016.01)

(52) U.S. Cl.
CPC ....... *G06F 12/0804* (2013.01); *G06F 12/0866* (2013.01)

(58) Field of Classification Search
None
See application file for complete search history.

(56) References Cited

U.S. PATENT DOCUMENTS

| | | | | |
|---|---|---|---|---|
| 6,549,959 B1* | 4/2003 | Yates et al. | | 710/22 |
| 8,549,230 B1* | 10/2013 | Chatterjee et al. | | 711/135 |
| 8,904,117 B1* | 12/2014 | Kalekar | | G06F 12/0804 711/119 |
| 2002/0166031 A1* | 11/2002 | Chen et al. | | 711/141 |
| 2014/0068197 A1* | 3/2014 | Joshi | | G06F 12/0866 711/135 |
| 2014/0143506 A1* | 5/2014 | Gole | | G06F 12/0842 711/143 |

OTHER PUBLICATIONS

Fusion-IO, "Fusion-io: A New Standard for Enterprise-class Reliability," 2011, available at http://www.fusionio.com/hitepapers/fusion-io-a-new-standard-for-enterprise-classreliability/.
IBM, "Disk Cache Write-Back versus Write-Through" in "Tuning IBM System x Servers for Performance" (section 11.6.7 p. 281), Aug. 2009, available at http://www.redbooks.ibm.com/redbooks/pdfs/sg245287.pdf.
Pure Storage, "FlashArray, The All-Flash Array for Every Enterprise", available at http://www.purestorage.com/flasharray (viewed Sep. 16, 2013).
The Register, "Dell spills its hot cache Fluid, hopes to beat off rivals", Jun. 18, 2012, available at http://www.theregister.co.uk/2012/06/18/dell_hermes/.
Ricardo Koller, Leonardo Marmol, Raju Rangaswami, Swaminathan Sundararaman,Nisha Talagala, Ming Zhao "Write Policies for Host-side Flash Caches," Feb. 2013, http://users.cis.fiu.edu/~raju/WWW/publications/fast2013/paper.pdf.
Violin Memory, Inc., Storage at the Speed of Memory, available at http://www.violin-memory.com/products/ (viewed Sep. 16, 2013).

* cited by examiner

*Primary Examiner* — Midys Rojas
*Assistant Examiner* — Jane Wei (57) ABSTRACT

Techniques for enabling integration between a storage system and a host system that performs write-back caching are provided. In one embodiment, the host system can transmit to the storage system a command indicating that the host system intends to cache, in a write-back cache, writes directed to a range of logical block addresses (LBAs). The host system can further receive from the storage system a response indicating whether the command is accepted or rejected. If the command is accepted, the host system can initiate the caching of writes in the write-back cache.

18 Claims, 7 Drawing Sheets

STORAGE INTEGRATION FOR HOST-BASED WRITE-BACK CACHING

BACKGROUND

In data center environments, host-based caching is becoming an increasingly popular technique for optimizing virtual machine (VM) access to data residing on shared storage. Generally speaking, a host system that supports this technique caches, in a portion of a local, high-speed storage device (e.g., a solid-state disk (SSD)) known as a "host cache," data that its VMs access from a shared storage system (e.g., a networked storage array). When the host system detects a VM read request for data that is already available in the host cache, the host system retrieves the data directly from the local storage device rather than performing a roundtrip to/from the shared storage system, thereby improving VM read performance.

One aspect of managing host-based caching involves determining how to handle VM write requests. With a "write-through" approach, the host system saves data for a write request synchronously in both the host cache of the local storage device and the shared storage system. Once the data is committed in both locations, the host system returns an acknowledgment to the originating VM indicating write completion. This approach has the benefit of maintaining the data in the host cache if a subsequent read request is made (and thus avoids network and storage disk latency when servicing the read request), but does not leverage the speed/locality of the local storage device to improve write performance.

With a "write-back" approach, the host system initially saves data for a write request solely in the host cache of the local storage device, without performing a synchronous save in the shared storage system. Once the data is committed in the host cache (referred to in this context as a "write-back cache"), the host system immediately returns an acknowledgement to the originating VM. At a later point in time, the host system flushes the data (considered "dirty data") from the write-back cache to the shared storage system, thereby completing the actual write process. The timing and manner in which this flushing occurs depends on the particular write-back policy that the host system uses (e.g., storage system-optimized, cache-optimized, in-order commit, etc.). Since the VM can proceed with its processing as soon as the host system completes its write to the cache, write-back caching offers significantly lower write latency than write-through caching. Thus, write-back caching is generally preferable over write-through caching for write-intensive or mixed read/write workloads.

Unfortunately, write-back caching suffers from its own set of disadvantages and pitfalls. For instance, in some situations write-back caching can result in data loss, which is a condition where a portion of the data written by a VM (and cached in the write-back cache) is not propagated to the shared storage system. This can occur if, e.g., the host system crashes or otherwise fails before all of the dirty data in the write-back cache can be flushed. In these cases, it generally will not be possible to access the lost (i.e., unflushed) data until the host system is restarted. If the failure occurred at the host system's local storage device (and there is no redundant backup), the unflushed data can be lost forever.

In other (or the same) situations, write-back caching can result in data corruption, which is a condition where the data on the shared storage system does not correspond to a valid storage state at any time during VM execution (in other words, the stored data is "inconsistent"). Data corruption can occur for a number of different reasons. For example, data corruption can occur on a recurring, but temporary, basis if the host system uses a write-back policy that flushes dirty data to the shared storage system in an order that is different from the order in which the data was originally written by the originating VM(s). To illustrate this, assume that the host system receives sequential VM write requests to blocks b1, b2, b3, and b4, but flushes these blocks in four separate flush operations in the alternative order b2, b4, b3, and b1 (for, e.g., storage optimization purposes). In this example, the data on the shared storage system will be temporarily corrupt between the completion of the first and fourth flush operations, since the states of the data between these flush operations will reflect storage states that would never occur if the writes were flushed in the original order.

Data corruption can also occur in a more permanent manner if another consumer attempts to access the data on the shared storage system without knowledge that unflushed data still exists in the write-back cache. For instance, a VM executing on another host system may attempt to write to the data, or the shared storage system itself may attempt to backup or replicate the data, before the write-back cache is fully flushed. This in turn, may cause certain writes to be incorrectly overwritten, or the data to be captured in an inconsistent state. The latter situation is particularly problematic for high-end storage systems such as enterprise-class storage arrays, since a large part of their value proposition over lower cost storage devices is their ability to independently perform storage management functions. If such an array cannot tell whether its stored data is consistent or inconsistent when a connected host system is performing write-back caching, the array cannot create backups, perform replications, or the like without potentially introducing data corruption, which negates a significant portion of its utility/value.

SUMMARY

Techniques for enabling integration between a storage system and a host system that performs write-back caching are provided. In one embodiment, the host system can transmit to the storage system a command indicating that the host system intends to cache, in a write-back cache, writes directed to a range of logical block addresses (LBAs). The host system can further receive from the storage system a response indicating whether the command is accepted or rejected. If the command is accepted, the host system can initiate the caching of writes in the write-back cache.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes an integration framework that enables a host system to intelligently cooperate with a shared storage system when performing host-based write-back caching. In one set of embodiments, the framework can be implemented in a "single host" context in which the integration occurs between the storage system and one host system. In these embodiments, the framework can include (1) a command that allows the host system to notify the storage system that it intends to begin write-back caching with respect to a range of logical block addresses (LBAs); (2) an error code that allows the storage system to request that the host system flush its write-back cache (either one-time or permanently); and (3) a command that allows the host system to notify the storage system that flushing of the write-back cache has been completed (and optionally, that no further write-back caching will be performed). With these commands/error codes, the host system and the storage system can cooperate in a manner that ensures the data associated with the identified range of LBAs is in a consistent state on the storage system before another consumer (e.g., a VM running on another host system, or the storage system itself) is allowed to access the data.

In another set of embodiments, the framework can be implemented in a "fault tolerant" context in which the integration occurs between the storage system and two host systems (i.e., "master" and "standby" host systems) that comprise coordinated VMs and coordinated "master" and "standby" write-back caches. In these embodiments, the framework can include (1) a command that allows the master or standby host system to notify the storage system that it intends to begin write-back caching with respect to a range of LBAs (with qualifiers that indicate whether the command is originating from the master or standby); and (2) a command that allows the standby host system to determine whether a block (or range of blocks) that it considers dirty has been committed from the master write-back cache to the storage system. With these commands, the standby host system can effectively prune the dirty block list for its standby write-back cache (and thus keep the standby write-back cache consistent with the master write-back cache) without directly communicating with the master host system. In addition, these commands can facilitate failover from the master host system to the standby host system in the case of a failure of the master.

I. Single Host Context

Figure 1:
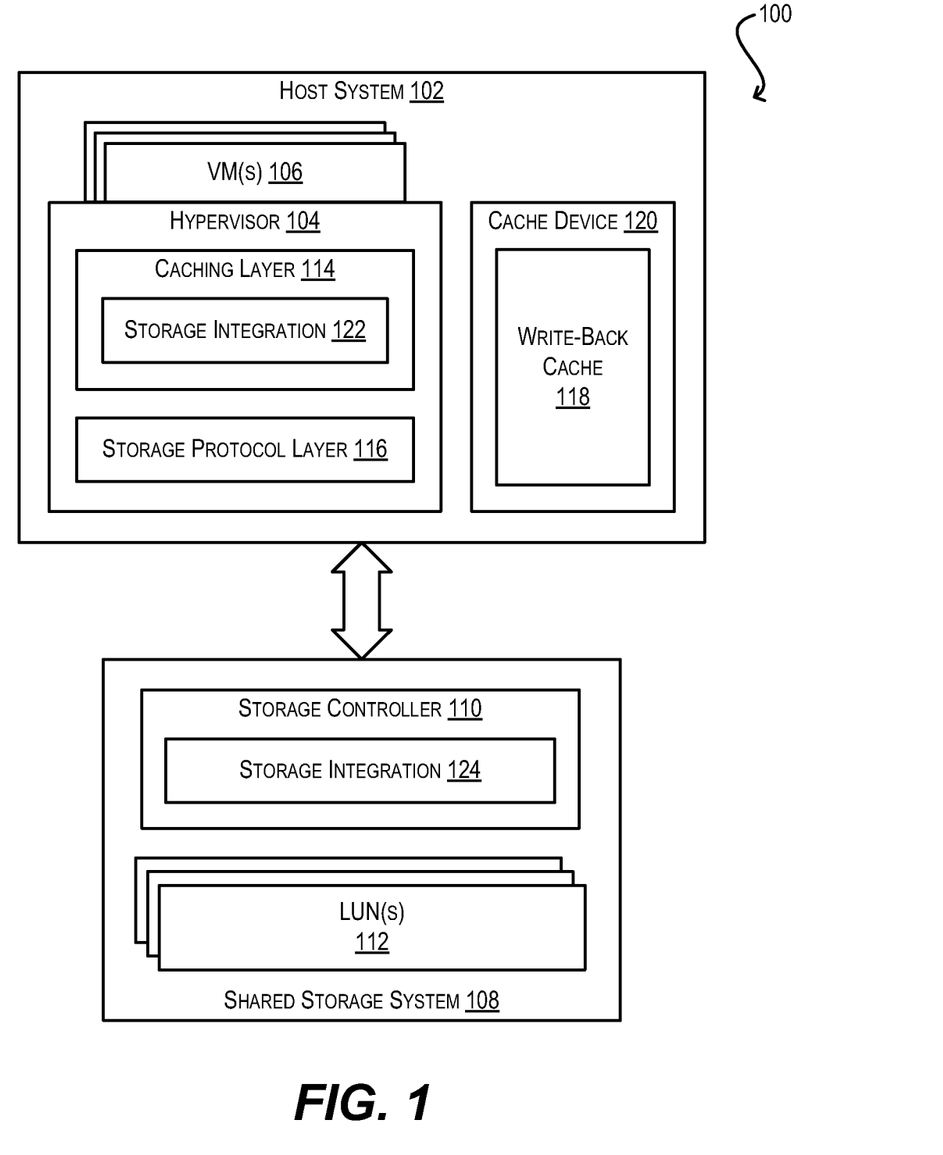
FIG. 1 depicts a system environment that supports storage integration for host-based write-back caching according to an embodiment.

FIG. 1 depicts a system environment 100 that supports storage integration for write-back caching in a single host context according to an embodiment. As shown, system environment 100 includes a host system 102 that executes a hypervisor 104 (also known as a "virtualization layer" or "virtualization software"). Hypervisor 104 provides an environment in which one or more VMs 106 can run. In one embodiment, hypervisor 104 can interact directly with the hardware platform of host system 102 without an intervening host operating system. In this embodiment, hypervisor 104 can include a kernel (not shown) that manages VM use of the various hardware devices of host system 102. In an alternative embodiment, hypervisor 104 can be part of a "hosted" configuration in which the hypervisor runs on top of a host operating system (not shown). In this embodiment, hypervisor 104 can rely on the host operating system for physical resource management of hardware devices. One of ordinary skill in the art will recognize various modifications and alternatives for the design and configuration of hypervisor 104.

In addition to host system 102, system environment 100 includes a shared storage system 108 that comprises a storage controller 110 and one or more logical disks, referred to as logical unit identifiers (LUNs) 112. Each LUN 112 corresponds to a set of one or more physical disks that can store persistent data (in the form of, e.g., virtual disk files (VMDKs)) accessed by VM(s) 106 of host system 102. In one embodiment, shared storage system 108 can be a storage device or system that supports the Small Computer System Interface (SCSI), such as a SCSI-based storage array. In other embodiments, shared storage system 108 can support any other type of storage communication protocol. Although shared storage system 108 is depicted in FIG. 1 as being connected solely to host system 102, it should be appreciated that shared storage system 108 can be connected to (and thus shared among) multiple host systems.

In operation, hypervisor 104 of host system 102 can perform write-back caching of write requests originating from VM(s) 106 and destined for shared storage system 108. For example, hypervisor 104 can intercept, via a caching layer 114, a VM write request directed to a particular VMDK residing on one or more LUNs 112, and can store the data associated with the write request (i.e., the "write data") in a write-back cache 118 resident on a local cache device 120. Local cache device 120 can be, e.g., a flash storage device (such as an SSD, PCI-e flash card, etc.), a volatile memory device (such as RAM), or any other type of local storage component. Hypervisor 104 can then return an acknowledgment to the originating VM indicating that the write operation has been completed.

At a later point in time (as determined by the write-back policy implemented by caching layer 114), caching layer 114 can communicate one or more internal commands to a storage protocol layer 116 of hypervisor 104 for flushing the write data from write-back cache 118 to shared storage system 108. In response, storage protocol layer 116 can translate the internal command(s) into one or more storage protocol commands (e.g., SCSI commands) understood by shared storage system 108 and transmit the storage protocol command(s) to storage controller 110. Upon receiving the storage protocol command(s), storage controller 110 can take appropriate action for committing the write data in LUN(s) 112, thereby completely the flush process.

As noted the Background section, one of the pitfalls of performing write-back caching as described above is that data loss and/or data corruption can occur in shared storage system 108 if a consumer other than VM 106 of host system 102 attempts to access the write data before it can be fully flushed from write-back cache 118. For example, data loss/corruption can occur if a VM executing on another host system connected to shared storage system 108 (not shown) attempts to read/write the same data blocks, or if shared storage system 108 itself attempts to perform an independent backup or replication of the data. In the past, this has meant that shared access to such data has generally been prohibited.

To address this issue, host system 102 and shared storage system 108 can each include a novel storage integration component (122 and 124). Although storage integration components 122 and 124 are shown in FIG. 1 as being part of caching layer 114 and storage controller 110 respectively, it should be appreciated that these components can be implemented at other locations within the software stack of host system 102 and shared storage system 108. At a high level, storage integration components 122 and 124 can allow host system 102 and shared storage system 108 to communicate, via a new set of storage protocol commands/error codes, information regarding the write-back caching performed by host system 102. This, in turn, can enable shared storage system 108 to know when a given chunk of data is in a consistent state, and thus can facilitate shared access to the data.

For instance, in one embodiment, the new storage protocol commands/error codes can include a "cache notification" command that host system 102 can use to notify shared storage system 108 that it intends to begin write-back caching with respect to a specified range of storage protocol-level data blocks (e.g., logical block addresses (LBAs)). The range of data blocks can correspond to, e.g., a VMDK stored on one or more LUNs 112 of shared storage system 108. In this way, shared storage system 108 can become aware that its stored version of these data blocks may be inconsistent/corrupt if another consumer attempts to access the same data. In some embodiments, shared storage system 108 can return a response to the cache notification command that either accepts or rejects the command. In the former case, host system 102 can initiate write-back caching as planned. In the latter case, host system 102 can fall back to performing write-through caching or read caching.

In another embodiment, the new storage protocol commands/error codes can include a "flush required" error code that shared storage system 108 can use to request host system 102 to flush the entirety of its write-back cache. For example, shared storage system 108 can send the flush required error code when it wishes to perform a backup or replication operation, or when another VM/host system has requested access to the write-back cached data range (and thus shared storage system 108 needs its stored version of the data to be in a consistent state). The request can apply on a one-time or permanent basis.

In yet another embodiment, the new storage protocol commands/error codes can include a "flush complete" command that host system 102 can use to notify shared storage system 108 that the write-back cache has been flushed. As an option to this command, host system 102 can specify (via a "cache complete" flag) whether host system 102 will continue to perform, or refrain from performing, further write-back caching with respect to the range of data blocks specified via the initial cache notification command. In one embodiment, host system 102 can issue the flush complete command in response to receiving the flush required error code described above from shared storage system 108. In this embodiment, upon receiving the flush complete command, shared storage system 108 can, e.g., complete its storage operation or provide shared data access to another VM/host system. In other embodiments, host system 102 can issue the flush complete command autonomously in order to inform shared storage system 108 that it will no longer be performing write-back caching.

With the new commands/error codes described above, shared storage system 108 can have greater visibility into, and control over, the write-back caching activities performed by host system 102. Accordingly, shared storage system 108 can intelligently manage shared access to write-back cached data in a way that minimizes or avoids data loss/corruption. One practical benefit of this storage integration capability is that it allows shared storage system 108 to safely perform independent storage management functions, such as backups, snapshots, replication, and the like, while write-back caching is enabled on host system 102. This can be particularly valuable for storage vendors that sell high-end storage systems such as enterprise-class storage arrays, since these storage vendors rely on such storage management features as a way to differentiate their products from lower-cost storage devices.

In some embodiments, the new commands/error codes can be implemented as extensions of the SCSI command set. For example, the cache notification and flush complete commands can be implemented as new SCSI commands, and the flush required error code can be implemented as a new SCSI check condition. Alternatively, the new commands/error codes can be implemented using any other storage communication protocol (e.g., NFS, SATA, etc.) that is understood by host system 102 and shared storage system 108.

Figure 2:
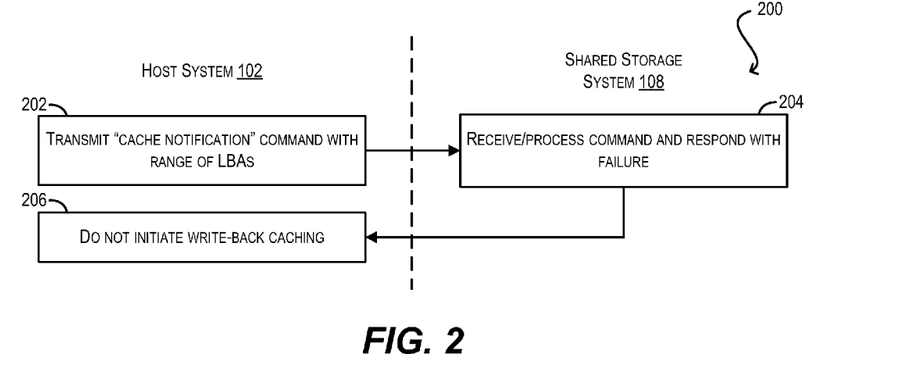
FIG. 2 depicts a flowchart of a first storage integration scenario involving a single host system according to an embodiment.

FIGS. 2-5 depict exemplary flowcharts 200-500 that demonstrate how host system 102 and shared storage system 108 can use the cache notification, flush required, and flush complete commands/error codes in various "single host" storage integration scenarios. For instance, flowchart 200 of FIG. 2 illustrates a scenario where shared storage system 108 can reject host system 102's initial cache notification command. This scenario can occur if, e.g., shared storage system 108 does not support certain storage integration features, or if there is another consumer that is already accessing the specified range of data.

At block 202 of flowchart 200, host system 102 can transmit the cache notification command with a range of LBAs to shared storage system 108. As noted previously, the range of LBAs can represent data that host system 102 intends to begin caching in write-back cache 118. In one embodiment, the range of LBAs can correspond to a particular VMDK that is accessed by a VM 106 executing on host system 102.

At block 204, shared storage system 108 can receive/process the cache notification command and determine that host system 102 should not begin write-back caching. Accordingly, shared storage system 108 can return a response with a "failure" (or some other similar) status.

At block 206, host system 102 can receive the response and refrain from initiating write-back caching for the specified range of LBAs. For example, host system 102 may fall back to performing read caching or write-through caching only.

Figure 3:
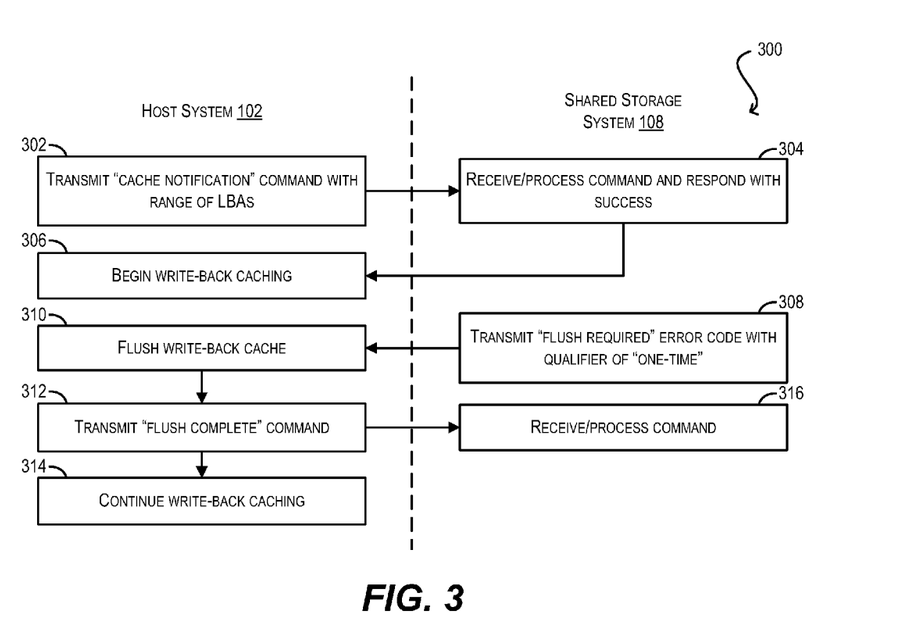
FIG. 3 depicts a flowchart of a second storage integration scenario involving a single host system according to an embodiment.

Flowchart 300 of FIG. 3 illustrates a scenario where shared storage system 108 can accept host system 102's initial cache notification command and subsequently request that host system 102 perform a one-time flush of write-back cache 118. This scenario can occur if, e.g., shared storage system 108 wishes to perform a backup, replication, or some other storage management operation with respect to the LBAs being write-back cached.

At block 302 of flowchart 300, host system 102 can transmit the cache notification command with a range of LBAs to shared storage system 108. At block 304, shared storage system 108 can receive/process the cache notification command and return a response with a "success" (or some other similar) status. Upon receiving the response, host system 102 can begin write-back caching (block 306).

At block 308, shared storage system 108 can determine that a one-time flush of host system 102's write-back cache is necessary. Accordingly, shared storage system 108 can transmit a response with the flush required error code to host system 102, where the error code includes a qualifier of "one-time."

At block 310, host system 102 can receive the flush required error code and can flush write-back cache 118. Upon completing the flush, host system 102 can transmit the flush complete command to shared storage system 108 and can continue write-back caching with respect to the original range of LBAs specified at block 302 (blocks 312 and 314).

At block 316, shared storage system 108 can receive/process the flush complete command and carry out the task(s) that triggered the one-time flush request (e.g., backup, replication, etc.).

Figure 4:
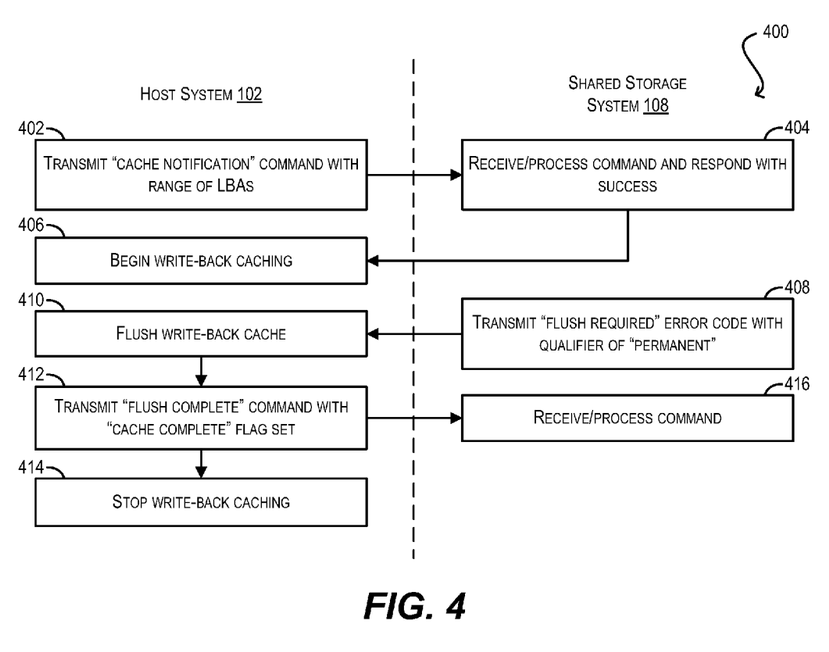
FIG. 4 depicts a flowchart of a third storage integration scenario involving a single host system according to an embodiment.

Flowchart 400 of FIG. 4 illustrates a scenario where shared storage system 108 can accept host system 102's initial cache notification command and subsequently request that host system 102 perform a permanent flush of write-back cache 118 (i.e., a flush followed by a termination of write-back caching). This scenario can occur if, e.g., another consumer (e.g., another VM/host system) has requested shared access to the write-back cached data for an undefined period of time.

At block 402 of flowchart 400, host system 102 can transmit the cache notification command with a range of LBAs to shared storage system 108. At block 404, shared storage system 108 can receive/process the cache notification command and return a response with a "success" (or some other similar) status. Upon receiving the response, host system 102 can begin write-back caching (block 406).

At block 408, shared storage system 108 can determine that a permanent flush of host system 102's write-back cache is necessary. Accordingly, shared storage system 108 can transmit a response with the flush required error code to host system 102, where the error code includes a qualifier of "permanent."

At block 410, host system 102 can receive the flush required error code and can flush write-back cache 118. Upon completing the flush, host system 102 can transmit the flush complete command to shared storage system 108 with a "cache complete" flag set (block 412). The cache complete flag can indicate that no further write-back caching will be performed. Host system 102 can then stop its write-back caching of the range of LBAs specified at block 402 (block 414).

At block 416, shared storage system 108 can receive/process the flush complete command (with the cache complete flag) and carry out the task(s) that triggered the permanent flush request. For example, if a VM executing on another host system had requested shared access to the write-back cached data, shared storage system 108 can grant access at block 416.

It should be noted that, although the flush request described with respect to FIG. 4 is a "permanent" request, in certain embodiments host system 102 can still attempt to establish write back caching after the conclusion of flowchart 400 (by, e.g., re-entering any of flowcharts 100-500).

Figure 5:
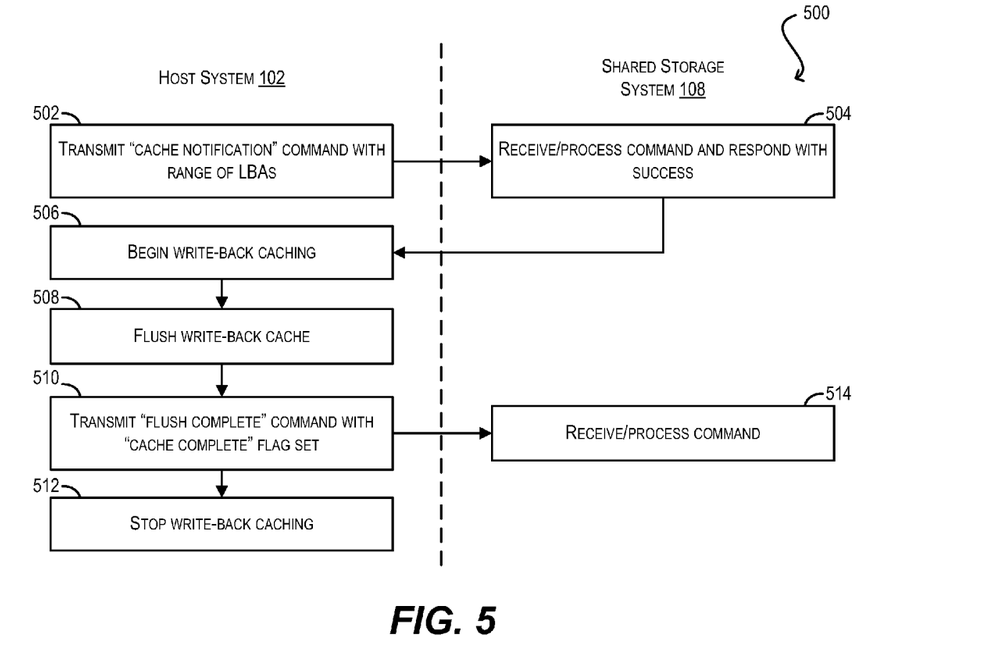
FIG. 5 depicts a flowchart of a fourth storage integration scenario involving a single host system according to an embodiment.

Flowchart 500 of FIG. 5 illustrates a scenario where host system 102 can begin write-back caching with respect to a range of LBAs (per the cache notification command) and then autonomously inform shared storage system 108 that it will stop write-back caching. This scenario can occur if, e.g., host system 102 determines that there is something wrong with write-back cache 118, or if host system 102 decides to move the process/VM using write-back cache 118 to another host system.

At block 502 of flowchart 500, host system 102 can transmit the cache notification command with a range of LBAs to shared storage system 108. At block 504, shared storage system 108 can receive/process the cache notification command and return a response with a "success" (or some other similar) status. Upon receiving the response, host system 102 can begin write-back caching (block 506).

At blocks 508 and 510, host system 102 can autonomously flush write-back cache 118 and transmit the flush complete command to shared storage system 108 with the cache complete flag set. In addition, at block 512, host system 102 can stop write-back caching with respect to the range of LBAs specified at block 502. In one embodiment, host system 102 should stop write back caching after sending the flush complete command with the cache complete flag in order to ensure storage consistency.

Finally, at block 514, shared storage system 108 can receive/process the flush complete command (with the cache complete flag) and thereby become aware that the range of LBAs is no longer being write-back cached. As a result, shared storage system 108 can allow any operations that require shared access to the data.

As with FIG. 4, in certain embodiments host system 102 can attempt to re-establish write back caching after the conclusion of flowchart 500 (by, e.g., re-entering any of flowcharts 100-500).

II. Fault Tolerant Context

Figure 6:
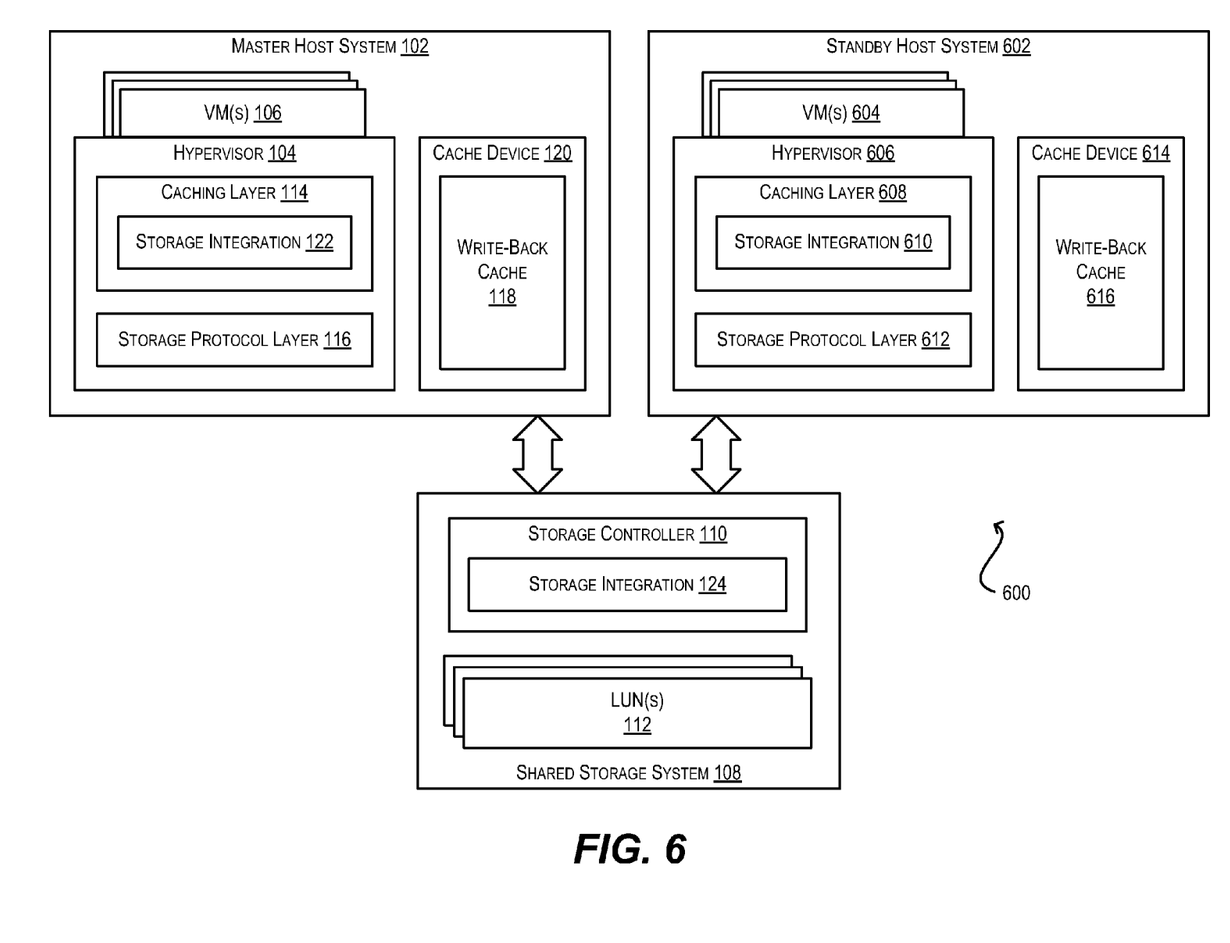
FIG. 6 depicts another system environment that supports storage integration for host-based write-back caching according to an embodiment.

As noted previously, in some embodiments the storage integration techniques described herein may be implemented in a context where the integration occurs between the storage system and two host systems (a master and a standby) that operate in a fault tolerant configuration. FIG. 6 depicts a system environment 600 that illustrates such a fault tolerant configuration according to an embodiment.

As shown in FIG. 6, system environment 600 includes a master host system 102 and a shared storage system 108 that are substantially similar to host system 102 and shared storage system 108 of FIG. 1. However, in addition to these entities, system environment 600 also includes a standby host system 602 that is configured to serve as fault tolerant backup of master host system 102. This means that standby host system 602 executes one or more "standby" VMs 604 that run in lockstep with corresponding "master" VMs 106 of master host system 102. This also means that standby host system 602 maintains a "standby" write-back cache 616 (in local cache device 614) that is populated in an identical manner as "master" write-back cache 118 of host system 102. The only difference between the operation of master host system 102 and standby host system 602 is that standby VM(s) 604 do not commit any output to network, video, or storage devices (such as shared storage system 108). In the event that master host system 102 crashes or otherwise becomes unavailable, standby host system 602 (which has an identical VM runtime state) can take over the workload of the failed master.

One challenge with implementing the fault tolerant configuration shown in FIG. 6 involves maintaining consistency between master write-back cache 118 and standby write-back cache 616. Although these caches are populated in a coordinated fashion (due to the lockstep execution of master VM(s) 106 and standby VM(s) 604), caching layer 608/ hypervisor 606 of standby host system 602 may not know when caching layer 114/hypervisor 104 of master host system 102 flushes the contents of master write-back cache 118 to shared storage system 108. As a result, caching layer 608 may not know when/how to prune the dirty block list for standby write-back cache 616 so that it remains consistent with master write-back cache 118.

One way to solve this problem is to implement a direct communication mechanism between master host system 102 and standby host system 602 (using, e.g., sideband control messages). With this mechanism, master host system 102 can inform standby host system 602 whenever one or more blocks of master write-back cache 118 are flushed to shared storage system 108, thereby enabling standby host system 602 to replicate the same action (by, e.g., marking those blocks as clean in standby write-back cache 616). However, this approach can significantly complicate the design and operation of hypervisors 104 and 606.

An alternative approach is to expand the integration framework described above with respect to the "single host" context. With this approach, standby host system 602 can be modified to include a storage integration component 610 that is similar to components 122 and 124 of master host system 102 and shared storage system 108 respectively. In addition, storage integration components 610, 122, and 214 can be adapted to recognize/process new storage protocol commands that are unique to the fault tolerant context, and that can enable indirect communication between master host system 102 and standby host system 602 regarding the status of write-back caches 118 and 616.

For example, in one embodiment, the new storage protocol commands can include a "cache notification" command that either master host system 102 or standby host system 602 can transmit to shared storage system 108. Like the cache notification command described in the single host context, this command can notify shared storage system 108 that write-back caching will be initiated for a range of LBAs. However, the fault tolerant cache notification command can include two additional qualifiers, or flags: a "standby present" flag and an "assuming control" flag.

The standby present flag can be set by master host system 102 in order notify shared storage system 108 that there is a "listening cache" (e.g., standby write-back cache 616) present for the specified range of LBAs. When this flag is set/enabled, shared storage system 108 can allow the listening cache to perform certain storage commands that do not trigger a flush request from storage.

The assuming control flag can be set by standby host system 602 in order to notify shared storage system 108 that it is taking over the duties of master host system 102 (in the scenario where master host system 102 crashes). When this flag is set/enabled, shared storage system 108 can fail any further I/O requests from master host system 102 as an assurance that system 102 (which has been determined to be a failed host) no longer writes anything to the cache-backed data.

In addition to the cache notification command, the new storage protocol commands supported by storage integration components 610, 122, and 124 can further include a "write query" command. In various embodiments, standby host system 602 can transmit the write query command to shared storage system 108 on a periodic basis to in order to determine whether a particular LBA (or list of LBAs) in standby write-back cache 616 that it considers dirty has been flushed from master write-back cache 118. If shared storage system 108 indicates that the specified LBA(s) have been flushed, standby host system 602 can mark the LBA(s) as clean and optionally evict those blocks from standby write-back cache 616. In this way, standby host system 602 can keep standby write-back cache 616 consistent with master write-back cache 118, without requiring a separate sideband communication mechanism. In certain embodiments, standby host system 602 can include, as part of the write query command, a checksum value for each specified LBA. Shared storage system 108 can use the checksum values to verify that the contents of the block in standby write-back cache 616 match the contents of the corresponding block stored on shared storage system 108.

Figure 7A:
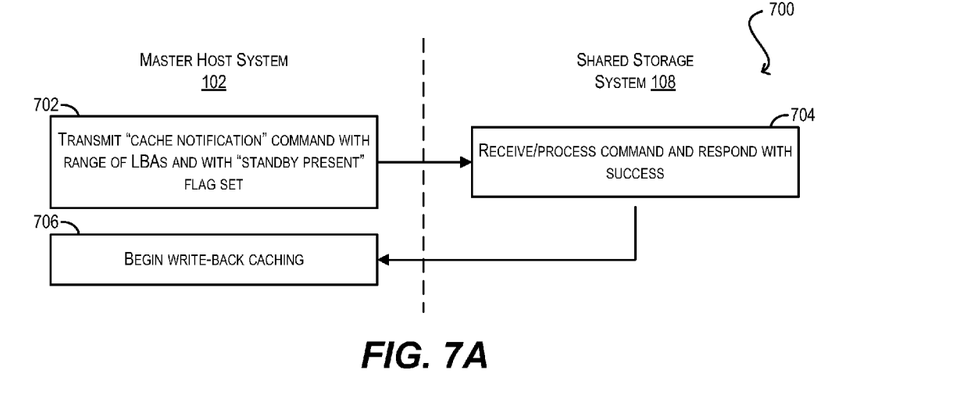
FIGS. 7A, 7B, and 7C depict flowcharts of a storage integration scenario involving fault tolerant host systems according to an embodiment.
Figure 7B:
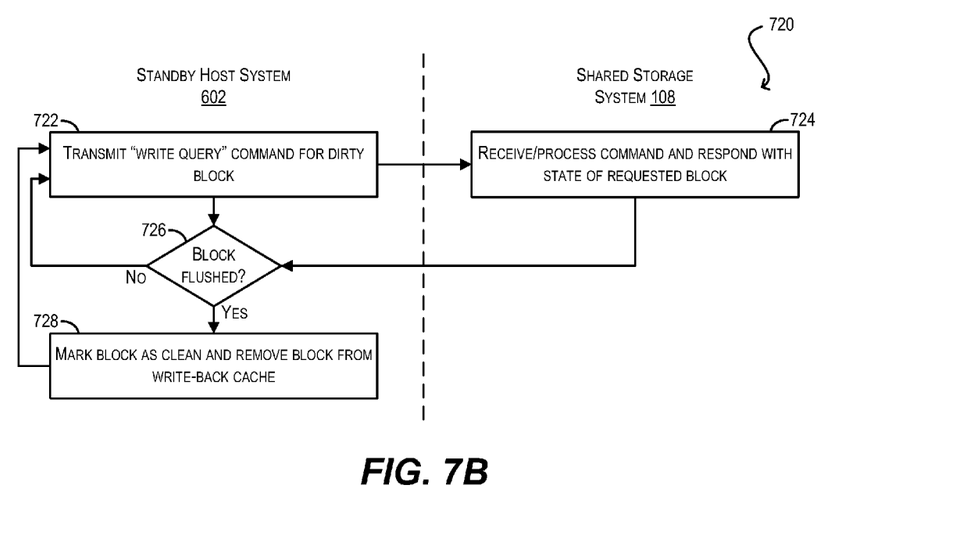
Figure 7C:
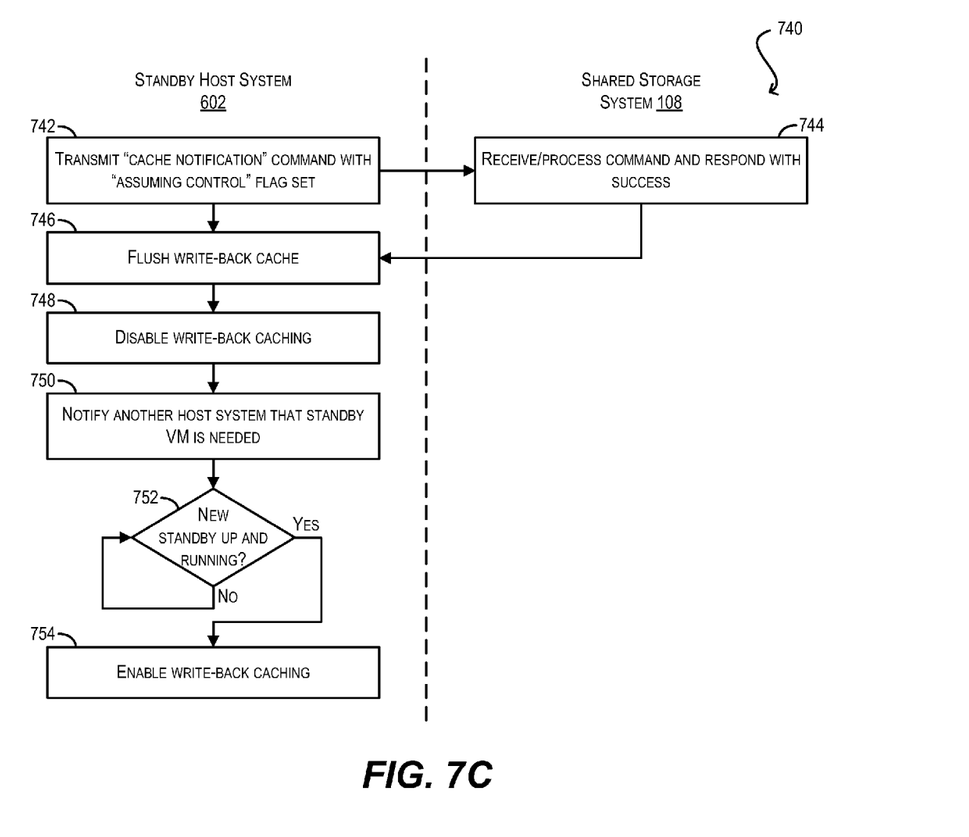

FIGS. 7A, 7B, and 7C depict exemplary flowcharts 700, 720, and 740 that demonstrate how master host system 102 and standby host system 602 can use the cache notification and write query commands described above in a typical failover scenario. Starting with FIG. 7A, at block 702, master host system 102 can transmit the cache notification command, with a range of LBAs and the standby present flag set, to shared storage system 108.

At block 704, shared storage system 108 can receive/process the cache notification command and return a response with a "success" (or some other similar) status. Upon receiving the response, master host system 102 can begin write-back caching (block 706).

Moving on to FIG. 7B, while master host system 102 is performing write-back caching per block 706 of FIG. 7A, standby host system 602 can transmit the write query command, with an LBA for a dirty block in standby write-back cache 616, to shared storage system 108 (block 722). At block 724, shared storage system 108 can receive the write query command and determine whether the specified LBA has been flushed or not. Shared storage system 108 can then return the status of the LBA to standby host system 602.

If the LBA has been flushed, standby host system 602 can mark the block as clean, remove the block from standby write-back cache 616, and return to block 722 to transmit additional write query commands on a periodic basis (blocks 726 and 728). On the other hand, if the LBA has not been flushed, standby host system 602 can take no action and simply return to block 722 (block 726). Flowchart 720 can loop in this manner while master host system 102 continues to perform write-back caching. In another embodiment the write query command can specify an LBA range so that a multiplicity of blocks can be queried in a single command and the response would be that the LBA range had not been flushed unless all blocks in the range had been flushed.

At some point, it is assumed that master host system 102 can fail. FIG. 7C depicts a process for recovering from this failure. At block 742, standby host system 602 (which is now the new master) can transmit the cache notification command, with the range of LBAs and the assuming control flag set, to shared storage system 108. At block 744, shared storage system 108 can receive/process the cache notification command and return a response with a "success" (or some other similar) status. Further, because the assuming control flag was set, shared storage system 108 can implement a validation lock that prevents the acceptance/processing of any further I/O requests from failed host system 102.

Upon receiving the response, new master host system 602 can flush its write-back cache 616 (block 746). In addition, new master host system 602 can temporarily disable write-back caching and notify another host system that a standby VM is needed (blocks 748 and 750). Once new master host system 602 verifies that the new standby is up and running (with a corresponding standby write-back cache), new master host system 602 can re-enable write-back caching (blocks 752 and 754). The new standby host system can then periodically issue write query commands per FIG. 7B, and the failover process of FIG. 7C can repeat if new master host system 602 subsequently fails.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for enabling integration between a storage system and a host system that performs write-back caching, the method comprising:

transmitting, by the host system to the storage system, a first command indicating that the host system intends to cache, in a write-back cache local to the host system, writes directed to a range of logical block addresses (LBAs) of a storage object stored on the storage system, wherein the writes originate from one or more storage clients resident on the host system;

receiving, by the host system from the storage system, a response indicating that the first command is accepted;

based on the response, initiating, by the host system, caching of the writes in the write-back cache;

receiving, by the host system from the storage system, a first message indicating that the entirety of the write-back cache should be flushed once;

in response to the first message:

flushing, by the host system, the entirety of the write-back cache;

transmitting, by the host system to the storage system, a second command indicating that the flushing is complete; and         continuing the caching;

receiving, by the host system from the storage system, a second message indicating that the entirety of the write-back cache should be flushed permanently, such that the caching of writes to the write-back cache is terminated on the host system; and     in response to the second message:

flushing, by the host system, the entirety of the write-back cache;

transmitting, by the host system to the storage system, a third command indicating that the flushing is complete and no further write-back caching will be performed; and         terminating, by the host system, the caching of writes to the write-back cache.

2. The method of claim 1 further comprising, prior to receiving the second message:
   autonomously determining, by the host system, that write-back caching should be terminated; and
   in response to the determining:
      flushing the write-back cache;
      transmitting, to the storage system, a fourth command indicating that the flushing is complete and that no further write-back caching will be performed; and
      terminating the caching.

3. The method of claim 1 wherein the host system is a master host system in a fault tolerant configuration with a standby host system, wherein the first command includes a flag indicating that the standby host system is present, and wherein the method further comprises:
   transmitting, by the standby host system to the storage system, a fourth command querying whether one or more LBAs have been flushed by the master host system.

4. The method of claim 1 wherein the storage system is configured to transmit the first message upon determining that the storage system or another host system requires read access to the range of LBAs.

5. The method of claim 1 wherein the storage system is configured to transmit the second message upon determining that the storage system or another host system requires write access to the range of LBAs.

6. The method of claim 3 further comprising, upon a failure of the master host system:
   transmitting, by the standby host system to the storage system, the first command with a flag indicating that the standby host system will assume control of the range of LBAs.

7. A non-transitory computer readable storage medium having stored thereon software executable by a host system, the software embodying a method for enabling integration between a storage system and a host system that performs write-back caching, the method comprising:
   transmitting, by the host system to the storage system, a first command indicating that the host system intends to cache, in a write-back cache local to the host system, writes directed to a range of logical block addresses (LBAs) of a storage object stored on the storage system, wherein the writes originate from one or more storage clients resident on the host system;
   receiving, by the host system from the storage system, a response indicating that the first command is accepted;
   based on the response, initiating, by the host system, caching of the writes in the write-back cache;
   receiving, by the host system from the storage system, a first message indicating that the entirety of the write-back cache should be flushed once;
   in response to the first message:
      flushing, by the host system, the entirety of the write-back cache;
      transmitting, by the host system to the storage system, a second command indicating that the flushing is complete; and
      continuing the caching;
   receiving, by the host system from the storage system, a second message indicating that the entirety of the write-back cache should be flushed permanently, such that the caching of writes to the write-back cache is terminated on the host system; and
   in response to the second message:
      flushing, by the host system, the entirety of the write-back cache;
      transmitting, by the host system to the storage system, a third command indicating that the flushing is complete and no further write-back caching will be performed; and
      terminating, by the host system, the caching of writes to the write-back cache.

8. The non-transitory computer readable storage medium of claim 7 wherein the method further comprises, prior to receiving the second message:
   autonomously determining that write-back caching should be terminated; and
   in response to the determining:
      flushing the write-back cache;
      transmitting, to the storage system, a second command indicating that the flushing is complete and that no further write-back caching will be performed; and
      terminating the caching.

9. The non-transitory computer readable storage medium of claim 7 wherein the host system is a master host system in a fault tolerant configuration with a standby host system, wherein the first command includes a flag indicating that the standby host system is present, and wherein the method further comprises:
   transmitting, by the standby host system to the storage system, a fourth command querying whether one or more LBAs have been flushed by the master host system.

10. The non-transitory computer readable storage medium of claim 7 wherein the storage system is configured to transmit the first message upon determining that the storage system or another host system requires read access to the range of LBAs.

11. The non-transitory computer readable storage medium of claim 7 wherein the storage system is configured to transmit the second message upon determining that the storage system or another host system requires write access to the range of LBAs.

12. The non-transitory computer readable storage medium of claim 9 wherein the method further comprises, upon a failure of the master host system:
   transmitting, by the standby host system to the storage system, the first command with a flag indicating that the standby host system will assume control of the range of LBAs.

13. A computer system comprising:
   a processor;
   a write-back cache;
   one or more storage clients; and
   a non-transitory data store having stored thereon program code which, when executed by processor, causes the processor to:
      transmit, to a storage system, a first command indicating that the computer system intends to cache, in the write-back cache, writes directed to a range of logical block addresses (LBAs) of a storage object stored on the storage system, wherein the writes originate from the one or more storage clients;
      receive, from the storage system, a response indicating that the first command is accepted;
      based on the response, initiate caching of the writes in the write-back cache;

receive, from the storage system, a first message indicating that the entirety of the write-back cache should be flushed once;

in response to the first message:
flush the entirety of the write-back cache;
transmit, to the storage system, a second command indicating that the flushing is complete; and
continue the caching;

receive, from the storage system, a second message indicating that the entirety of the write-back cache should be flushed permanently, such that the caching of writes to the write-back cache is terminated on the host system; and in response to the second message:
flush the entirety of the write-back cache;
transmit, to the storage system, a third command indicating that the flushing is complete and no further write-back caching will be performed; and
terminate the caching of writes to the write-back cache.

14. The computer system of claim 13 wherein the program code further causes the processor to, prior to receiving the second message:
autonomously determine that write-back caching should be terminated; and in response to the determining:
flush the write-back cache;
transmit, to the storage system, a fourth command indicating that the flushing is complete and that no further write-back caching will be performed; and
terminate the caching.

15. The computer system of claim 13 wherein the computer system is a master host system in a fault tolerant configuration with a standby host system, wherein the first command includes a flag indicating that the standby host system is present, and wherein the standby host system is configured to transmit, to the storage system, a fourth command querying whether one or more LBAs have been flushed by the master host system.

16. The computer system of claim 13 wherein the storage system is configured to transmit the first message upon determining that the storage system or another computer system requires read access to the range of LBAs.

17. The computer system of claim 13 wherein the storage system is configured to transmit the second message upon determining that the storage system or another computer system requires write access to the range of LBAs.

18. The computer system of claim 15 wherein, upon a failure of the master host system, the standby host system is further configured to transmit, to the storage system, the first command with a flag indicating that the standby host system will assume control of the range of LBAs.

* * * * *